Jan. 17, 1928.
K. A. ENZ
1,656,183
VALVE
Filed Dec. 20, 1924     2 Sheets-Sheet 1
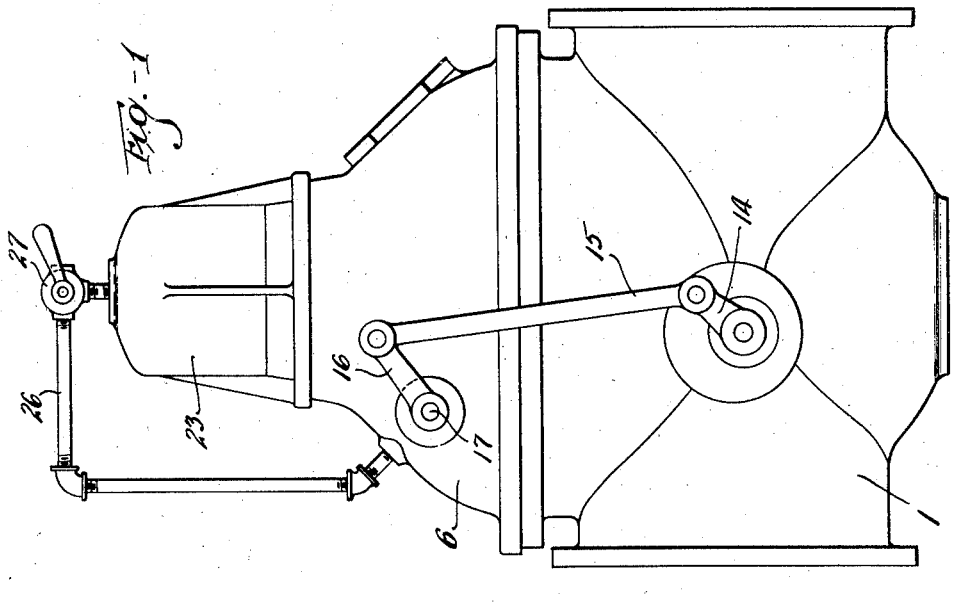
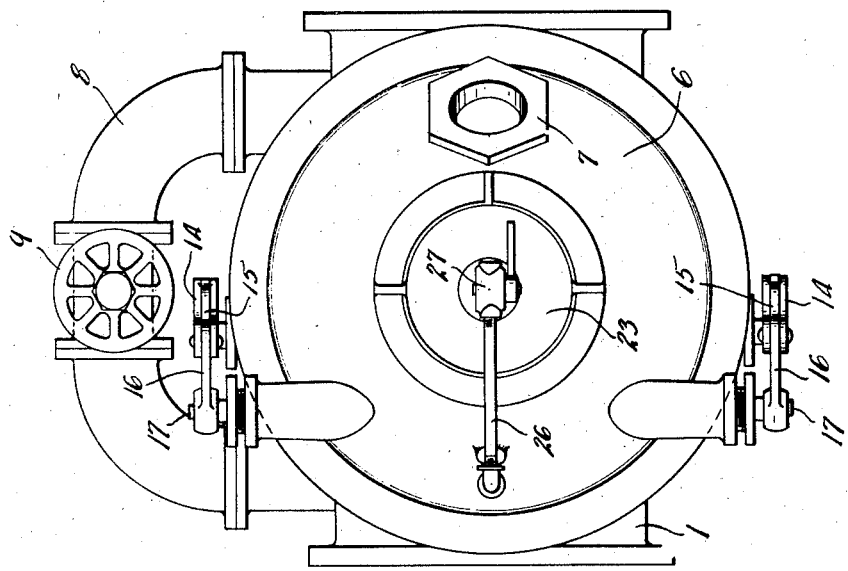
Inventor
Karl A. Enz.
By Brockett, Hyde & Milburn
Attorneys Jan. 17, 1928.  1,656,183
K. A. ENZ
VALVE
Filed Dec. 20, 1924   2 Sheets-Sheet 2
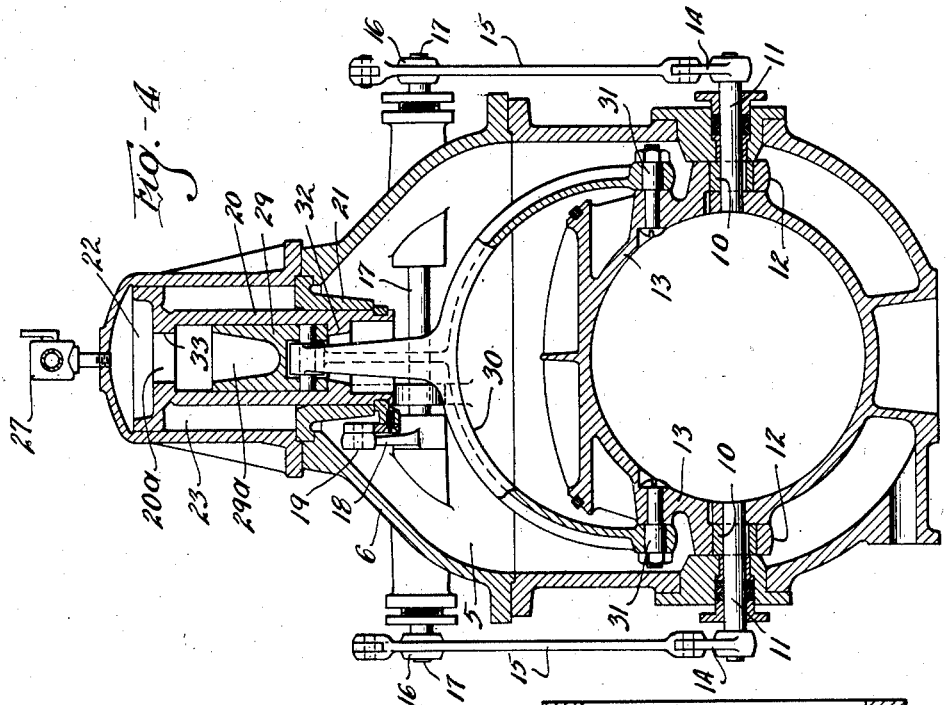
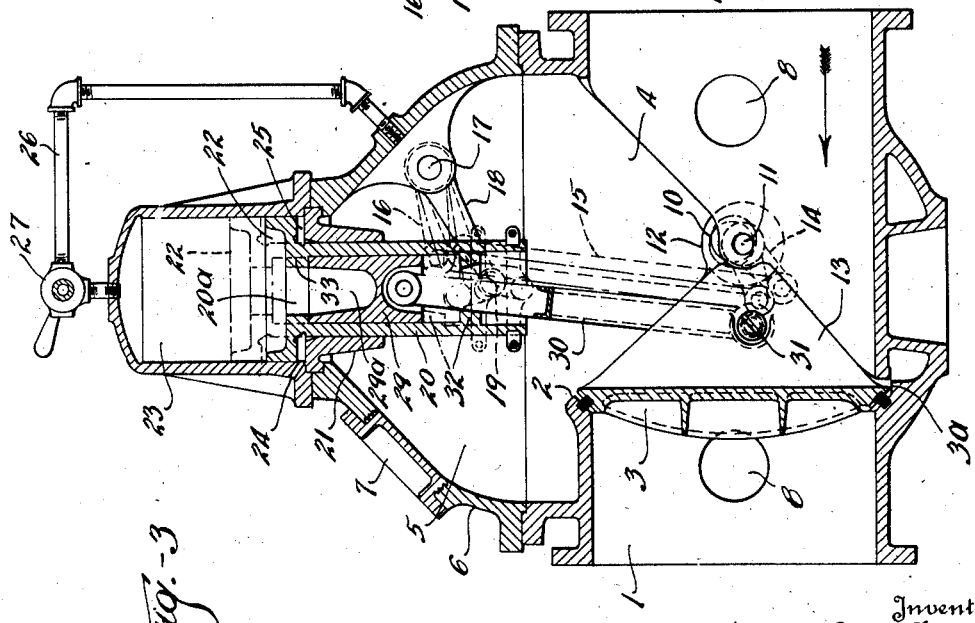
Inventor
Karl A. Enz
By Brockett-Hyde + Milburn.
Attorneys Patented Jan. 17, 1928.

1,656,183

UNITED STATES PATENT OFFICE.

KARL A. ENZ, OF CLEVELAND, OHIO.

VALVE.

Application filed December 20, 1924. Serial No. 757,215.

This invention relates to improvements in valve structures and operating mechanism therefor for controlling the flow of any fluid, as for instance water, steam or gases, and is especially adapted for use in connection with the water-way of the hydraulic turbine and irrigating system.

The objects of this invention are to provide such a valve which is leak-proof and which can be easily operated and which at the same time does not reduce the section or area of the water-way or other fluid conduit as it is swung into open position.

A further object is to provide such a device which will be substantially free from accident to the mechanism due to lodging of solid material between the valve and the walls of the fluid conduit.

More specifically, the present invention consists in a disc or valve and valve seat therefor which are provided with interengaging portions of substantially spherical or any other suitable form and in which the valve itself is adapted to be unseated or seated by movement in a direction substantially normal to the plane of the valve seat, and which is adapted to be swung bodily into and out of registry with the opening. In other words, in opening the valve, it is first unseated by a substantially straight line movement away from the valve seat and then swung bodily about a center into full open position; then in order to close the valve, it is first swung into registry or alignment with the opening and then brought into effective engagement with the valve seat by a straight line movement.

Another object of the present invention is to provide such a valve which, when in open position, will serve to supplement the walls of the tubular water-way by serving as part thereof when in such position.

Other objects of the present invention will appear from the following description and claims when considered together with the accompanying drawings.

Figs. 1 and 2 show my improvement device in front and top elevation respectively; and Figs. 3 and 4 are sectional views taken ninety degrees with respect to each other.

The tubular portion 1 of the water-way or other fluid conduit which leads to the turbine is provided with the valve seat 2 of circular form, conical according to the present illustration, for engagement by the disc or valve 3, the marginal portion of which is of corresponding form for effective seating engagement. Both the valve seat and the marginal portion of the valve are provided with suitable gaskets. The tubular portion 1 has the opening 4 communicating with the surrounding chamber 5 which is enclosed by the outer casing wall indicated generally by reference numeral 6. A man-hole is provided in the casing wall 6 and is closed by the cover 7 so as to permit access to the operating mechanism as well as to the valve itself. The usual by-pass 8 with the valve control 9 is also provided.

The valve 3 is adapted to be moved along a substantially straight line path substantially normal to the plane of the opening for the purpose of unseating the same before swinging it to fully open position, and reversely, for the purpose of swinging the same from fully open position into registry or alignment with the valve opening and then effecting closed or seating engagement of the valve with the valve seat by a straight line movement distinct from the swinging movement. The straight line movement of the valve for seating or unseating the same is effected by means of an eccentric 10 which is provided upon each of the stub shafts 11 arranged in diametrical alignment on opposite sides of the valve. The eccentric in each case is surrounded by the collar or stirrup 12 provided upon each side of the gate, so that as the eccentric is rotated by means of the shaft 11, the gate will be moved either toward or from seating engagement. The straps or stirrups 12 are provided upon the side portions 13 of the gate. The stub shafts 11 are operated by means of the crank arms 14 secured to the outer ends thereof, which crank arms are in turn pivotally connected to the links or connecting rods 15. The links 15 are in turn pivotally connected to the crank arms 16 which in turn are mounted upon the shaft 17 which is suitably supported in the casing wall 6. The shaft 17 is adapted to be rotated in either direction, according as the gate is to be opened or closed, by means of the crank arms 18 which have their other ends pivotally connected at the points 19 at diametrically opposite points to the one end of the cylinder 20 which constitutes part of the operating or motive means. The cylinder 20 is adapted to slide in either direction through the collar 21 which is mounted in the casing, the other end of the cylinder 20 being formed as an annular plunger portion 22 for sliding in the chamber 23. An air vent 24 is provided for the space 25 between the annular portion 22 and the one end of the collar 21 so as to permit escape and entrance of air according as the end head 22 is moved in one direction or another. The cylinder 20 is actuated by pressure of the water on the two ends thereof, such pressure being regulated by a pipe connection 26 provided with a two-way valve 27 for controlling the flow of water from the main casing through the pipe into the chamber 23 and for controlling the discharge.

Slidably mounted within the cylinder 20 there is provided the plunger 29 which by its movement is adapted to swing the gate to fully open position and reversely to swing the same back to position in registry or alignment with the valve opening. The plunger 29 is adapted to operate the yoke arm 30 which is pivotally connected at one end thereto and which at the ends of its two arms is pivotally connected as at 31 to the side portions of the valve itself. Fig. 3 represents the valve in fully closed position and it will be noted that the cylinder 20 is provided with an annular inner shoulder or projection 32 which, as the cylinder 20 is moved in one direction for unseating the valve, is adapted to engage the corresponding end of the plunger 29 so that thereafter the two parts move together. The other side of the annular shoulder or projection 32 is of sufficient area that pressure of the water thereupon will cause the cylinder 20 to move through the collar 21 for unseating the valve. The other end of the cylinder 20 is provided also with an annular shoulder 33 which is adapted to engage the corresponding end of the plunger 29.

From the above, it will be seen that with the parts in the position indicated in Fig. 3 of the drawings, the valve can be opened by proper adjustment of the valve 27. In this case, the valve 27 will be set so as to permit discharge of pressure from the cylinder 23 and at the same time permit the pressure of the water or other fluid within the casing 5 against the shoulder 32 to force the cylinder 20 upwardly as viewed in Fig. 3 of the drawings, and in this way actuate the eccentric through the connections already described for the purpose of unseating the valve before the swinging movement of the same is started. The parts are so constructed and arranged that upon the valve being effectively moved out of seating engagement with the valve seat, the annular shoulder 32 will come in contact with the end of the plunger 29 so that the plunger 29 will then be moved along with the cylinder 20 and as a result the valve will be swung bodily to fully open position, such position being determined by the engagement of the enlarged end 22 of the cylinder with the end of the casing 23. When the plunger 29 is moved together with the cylinder 20, the strap or stirrup 12 and the eccentric 10, which it surrounds, will move together as a unit so that there is no relative movement between them, but on the other hand the eccentric and the stirrup or strap are maintained in the same relation to each other as they were upon completion of the unseating operation. The sides or wings 13 together with the valve itself are of such shape and size as to approximately fill the opening 4 in the side of the tubular waterway or other fluid conduit when the valve is in open position.

When it is desired to close the valve, the control valve 27 is opened so as to permit the pressure in the main casing 5 to be transmitted through the pipe 26 into the chamber 23 and force the cylinder 20 downwardly together with the plunger 29 as viewed in Fig. 4, of the drawings. The pressure which thus enters the chamber 23 exerts itself upon the annular enlarged portion 22 and also upon the hollow portion 29$^a$ through the registering opening 20$^a$ in one end of the cylinder 20. Such operation of the cylinder 20 and plunger 29 together is effective in swinging the valve from fully open position to a position in substantial alignment or registry with the valve opening in a manner just reverse of that just now described for opening the valve. During such movement of the valve to position in alignment with the valve opening, the eccentric 10 and stirrup or strap 12 maintain the same positions with respect to each other, so that upon completion of the swinging movement these parts 10 and 12 are in the same position as they were upon completion of the unseating of the valve which constituted the first step in the opening operation. The swinging of the valve toward closed position is limited by any suitable means, such for instance as the engagement of the marginal portion of the valve with an abutment 3$^a$ provided in the casing wall. By this means, the movement of the plunger 29 and the parts operated thereby is limited so that from then on, the cylinder 20 moves away from the plunger 29 since the cylinder 20 with the parts operated thereby are free to continue to move so as to cause the eccentric 10 to effect the seating engagement of the valve upon the valve seat. The parts are then in the same position as shown in full lines in Fig. 3 of the drawings, and upon closing of the valve 27 so as to maintain the pressure in the casing 23, the valve will be maintained in such position against any accidental unseating of the same.

Thus it will be seen that I have provided a valve structure in which the valve itself is actually and effectively unseated, or in other words fully cleared from the valve seat before the opening swinging movement of the valve is started. Furthermore, the unseating and swinging of the valve are effected by two distinct movements which are caused to automatically follow one after the other, in proper sequence. Such a valve structure is substantially proof against leaking and at the same time is comparatively easy to operate. Moreover, since the valve itself is swung to one side of the course of the water or other fluid as it flows through the conduit, there is no obstruction thereto; but on the other hand, the particular design of the valve with its side portions co-operates with the tubular portion of the conduit as a means of directing the flow of fluid therethrough.

It is to be understood that the form of fluid conduit and valve might be varied according to the spirit of my present invention, and that other means might be devised for performing the operations comprehended by my invention, the present forms of actuating means being merely for purposes of illustration.

What I claim is:—

1. A valve mechanism comprising a casing having a straight conduit portion and a chamber communicating with said conduit portion, a valve having a face seating in said conduit transversely thereof, means for unseating and thereafter rotating said valve to a separating position between said conduit and chamber, and a surface upon said valve opposite said face adapted to form, in said position, with said casing a substantially continuous conduit.

2. A valve mechanism comprising a casing having a cylindrical passage therethrough and a chamber disposed laterally thereof and communicating with said passage by an opening substantially equal to that through said passage, a valve in said conduit seating transversely thereof, means arranged for actuation by fluid pressure in said chamber for unseating and thereafter rotating said valve to a separating position between said conduit and chamber, and a surface upon said valve adapted to form, in said position, with said casing, a passage of substantially uninterrupted surface.

3. A valve mechanism comprising a casing having a cylindrical passage therethrough and a valve chamber disposed laterally thereof and communicating with said passage by an opening substantially equal to that through said passage, a valve in said conduit seating transversely thereof, means arranged for actuation by fluid pressure in said chamber for unseating and thereafter rotating said valve to a separating position between said conduit and chamber, and a surface upon said valve adapted to form, in said position, with said casing, a passage of substantially uninterrupted surface, said valve actuating means comprising, a cylindrical chamber adjacent said valve chamber, a pair of concentric relatively movable plungers movable in and closing the passage between said chambers, the combined exposed head area of said plungers in said cylinder chamber being greater than in said valve chamber, connection between one of said plungers and said valve unseating means, connection between the other plunger and said valve rotating means, and valve means controlling the pressure in said cylinder chamber.

4. A valve mechanism comprising a casing having a cylindrical passage therethrough and a chamber disposed laterally thereof, and communicating with said passage by an opening substantially equal to that through said passage, a valve in said conduit seating transversely thereof, means arranged for actuation by fluid pressure in said chamber for unseating and thereafter rotating said valve to a separating position between said conduit and chamber, a surface upon said valve adapted to form, in said position, with said casing, a passage of substantially uninterrupted surface, said valve actuating means comprising a cylindrical chamber, a sleeve positioned between said cylindrical chamber and said first named chamber, an open ended cylinder having an enlarged plunger portion slidable in said cylinder chamber and a portion slidable in said sleeve, pressure relief means operative between said plunger portion and said sleeve, a piston arranged for limited movement in said cylinder, an eccentric bearing for said valve, said valve being rotatable in said bearing, connection between said piston and said valve, connection between said sleeve and said eccentric bearing, fluid connecting means between said chamber and said cylindrical chamber, and a valve in said connection adapted to admit the fluid pressure of said chamber to said cylindrical chamber, or relieve pressure in said cylinder chamber.

In testimony whereof I hereby affix my signature.

KARL A. ENZ.